(12) United States Patent
Bi et al.

(10) Patent No.: US 7,671,551 B2
(45) Date of Patent: Mar. 2, 2010

(54) UNIVERSAL BRUSHLESS DC MOTOR

(75) Inventors: Ronghua Bi, Zhongshan (CN); Aiqian Peng, Zhongshan (CN); Wenwei Huang, Zhongshan (CN); Maosen Zeng, Zhongshan (CN); Jianwei Jin, Zhongshan (CN)

(73) Assignee: Zhongshan Broad-Ocean Motor Co., Ltd., Zhongshan (CN)

( * ) Notice: Subject to any disclaimer, the term of this patent is extended or adjusted under 35 U.S.C. 154(b) by 89 days.

(21) Appl. No.: 11/764,208

(22) Filed: Jun. 17, 2007

(65) Prior Publication Data

US 2008/0050099 A1    Feb. 28, 2008

(30) Foreign Application Priority Data

Aug. 28, 2006    (CN)   .................. 2006 1 0037479

(51) Int. Cl.
*H02P 6/00*   (2006.01)
(52) U.S. Cl. .............. 318/400.01; 318/400.21; 318/400.22; 318/400.26
(58) Field of Classification Search ........ 318/254, 318/400.01, 400.21, 400.22, 400.26, 400.29
See application file for complete search history.

(56) References Cited

U.S. PATENT DOCUMENTS

| | | | | |
|---|---|---|---|---|
| 4,528,486 A | * | 7/1985 | Flaig et al. ............ | 318/400.21 |
| 4,546,293 A | * | 10/1985 | Peterson et al. ......... | 318/400.14 |
| 4,668,898 A | * | 5/1987 | Harms et al. ........... | 318/400.21 |
| 5,463,299 A | * | 10/1995 | Futami et al. ............ | 318/618 |
| 5,675,231 A | * | 10/1997 | Becerra et al. ........... | 318/801 |
| 5,739,650 A | * | 4/1998 | Kimura et al. .......... | 318/400.07 |
| 5,912,541 A | * | 6/1999 | Bigler et al. ............ | 318/600 |
| 6,307,336 B1 | * | 10/2001 | Goff et al. ............. | 318/400.09 |
| 6,545,438 B1 | * | 4/2003 | Mays, II ............... | 318/400.01 |
| 6,577,087 B2 | * | 6/2003 | Su ...................... | 318/400.07 |
| 6,727,668 B1 | * | 4/2004 | Maslov et al. .......... | 318/400.41 |
| 7,141,943 B2 | * | 11/2006 | Song et al. ............ | 318/400.34 |

* cited by examiner

*Primary Examiner*—Bentsu Ro
*Assistant Examiner*—Thai Dinh
(74) *Attorney, Agent, or Firm*—Matthias Scholl P.C.; Matthias Scholl

(57) ABSTRACT

The invention teaches a brushless DC motor, comprising a brushless DC motor unit and a controller unit, wherein the brushless DC motor unit comprises a stator assembly, a permanent magnet rotor assembly magnetically coupled with the stator assembly, an enclosure supporting the installation of stator assembly and the permanent magnet rotator assembly, an end shield installed at the end of the enclosure, the rotating shaft of the permanent magnet rotor assembly projecting out of the end shield; the controller unit comprises an integrated power module, a microprocessor unit, a rotor position sensing circuit, a power source circuit, an I/O interface circuit, a current-sensing circuit, and a controller box; and the controller unit is electrically connected to the brushless DC motor unit. The brushless DC motor of the invention has an ideal control circuit with a plurality of control units serving to control the motor operation characteristics stored in the microprocessor unit so that the brushless DC motor is broadly universal and can be operated under a plurality of control modes.

11 Claims, 3 Drawing Sheets

UNIVERSAL BRUSHLESS DC MOTOR

CROSS-REFERENCE TO RELATED APPLICATIONS

Pursuant to 35 U.S.C. §119 and the Paris Convention Treaty, this application claims the benefit of Chinese Patent Application No. 200610037479.1 filed Aug. 28, 2006, the contents of which are incorporated herein by reference.

BACKGROUND OF THE INVENTION

1. Field of the Invention

The invention relates to a brushless DC motor, and more particularly to a universal brushless DC motor.

2. Description of the Related Art

Conventional brushless DC motors adopt a special integrated circuit as a drive circuit, and generally operate as an open loop system. In principle, they can be integrated with a control system of a device to be driven to form a closed loop system, but the high cost of development of such system is generally prohibitive. For example, a brushless DC motor developed for use in electric fans may be only slightly different in terms of control from a motor that would be otherwise fit to drive air conditioners; however, it may be less expensive to develop the latter from scratch rather than by converting the former.

SUMMARY OF THE INVENTION

Therefore, it is an objective of the invention to provide a universal brushless DC motor that can be operated in multiple control modes.

To achieve the above objective, provided a brushless DC motor, comprising a brushless DC motor unit and a controller unit.

In certain embodiments of the invention, the brushless DC motor unit comprises a stator assembly, a permanent magnet rotor assembly magnetically coupled with the stator assembly, an enclosure supporting the installation of stator assembly and the permanent magnet rotor assembly, and an end shield installed at the end of the enclosure.

In certain embodiments of the invention, the rotating shaft of the permanent magnet rotor assembly projects out of the end shield.

In certain embodiments of the invention, the controller unit comprises an integrated power module, a microprocessor unit, a rotor position sensing circuit, a power source circuit, an I/O interface circuit, a current-sensing circuit, and a controller box.

In one class of this embodiment, the output terminal of the microprocessor unit is connected to the input terminal of the integrated power module.

In one class of this embodiment, the output terminal of the integrated power module is connected to the winding of the stator assembly.

In one class of this embodiment, the input terminal of the rotor position sensing circuit is connected to the output terminal of the integrated power module or is connected to the detector serving to detect the position of the permanent magnet rotor assembly.

In one class of this embodiment, the output terminal of the rotor position sensing circuit is connected to the input terminal of the microprocessor unit.

In one class of this embodiment, the input terminal of the current-sensing circuit is connected to the output terminal of the integrated power module.

In one class of this embodiment, the output terminal of the current-sensing circuit is connected to the input terminal of the microprocessor unit.

In one class of this embodiment, the input terminal of the power source circuit is connected to an external power source.

In one class of this embodiment, the output terminal of the power source circuit serves to power various circuits.

In one class of this embodiment, the I/O interface circuit serves to bidirectionally electrically connect the microprocessor unit and a system to be powered by the brushless DC motor so as to realize data exchange.

In one class of this embodiment, the above circuits are fabricated into printed circuit board, which is installed inside of the controller box.

In one class of this embodiment, the controller unit is assembled as shown below, and is electrically connected to the brushless DC motor unit.

In certain embodiments of the invention, the stator assembly of the brushless DC motor comprises a stator core, a plurality of windings coiled on the stator core, and a winding connecting wire.

In one class of this embodiment, one end of the winding connecting wire is connected to the winding; the other end of the winding connecting wire is connected to the controller.

In certain embodiments of the invention, the I/O interface circuit comprises a plurality of low voltage signal processing circuits.

In one class of this embodiment, the low voltage signal processing circuit is bidirectionally electrically connected to the microprocessor unit.

In certain embodiments of the invention, a plurality of control units serving to control the operation characteristics of the motor are stored in the microprocessor unit, including: torque regulation control unit, rotating speed regulation control unit, and air volume regulation control unit.

By selecting different control unit of the microprocessor unit and inputting motor operation parameters through the I/O interface circuit, the brushless DC motor unit can be operated under the desired parameters.

In certain embodiments of the invention, the integrated power module comprises at least the functional circuits of the H bridge inverter circuit, the gate drive circuit, and the overheat protecting circuit.

In one class of this embodiment, the output terminal of the H-bridge inverter circuit is connected to the connecting wire of the winding, the output terminal of the gate drive circuit is connected to the input terminal of H bridge inverter circuit, and the output terminal of the overheat protecting circuit is connected to the input terminal of the gate drive circuit.

In certain embodiments of the invention, the voltage value at the output terminal of the power source circuit comprises at least a 5V DC voltage, a 15V DC voltage, and a DC bus voltage provided by an external power supply.

As a result, the brushless DC motor of the invention provides the following advantages. (1) It operates in a status of closed loop and has an ideal control circuit. (2) A plurality of control units serving to control the motor operation characteristics are stored in the microprocessor unit, so that the brushless DC motor is universal and can be operated under a plurality of control modes. (3) The control needs of various products employing the brushless DC motor are satisfied, the R&D period and work load are decreased, and the product cost is reduced. (4) Only one type of a universal brushless DC motor needs to be manufactured for various applications.

BRIEF DESCRIPTION OF THE DRAWINGS

The objects and advantages of the invention will become more readily apparent after reading the ensuing descriptions of the non-limiting illustrative embodiment and viewing the accompanying drawings, in which.

DETAILED DESCRIPTION OF THE EMBODIMENTS

Figure 1:
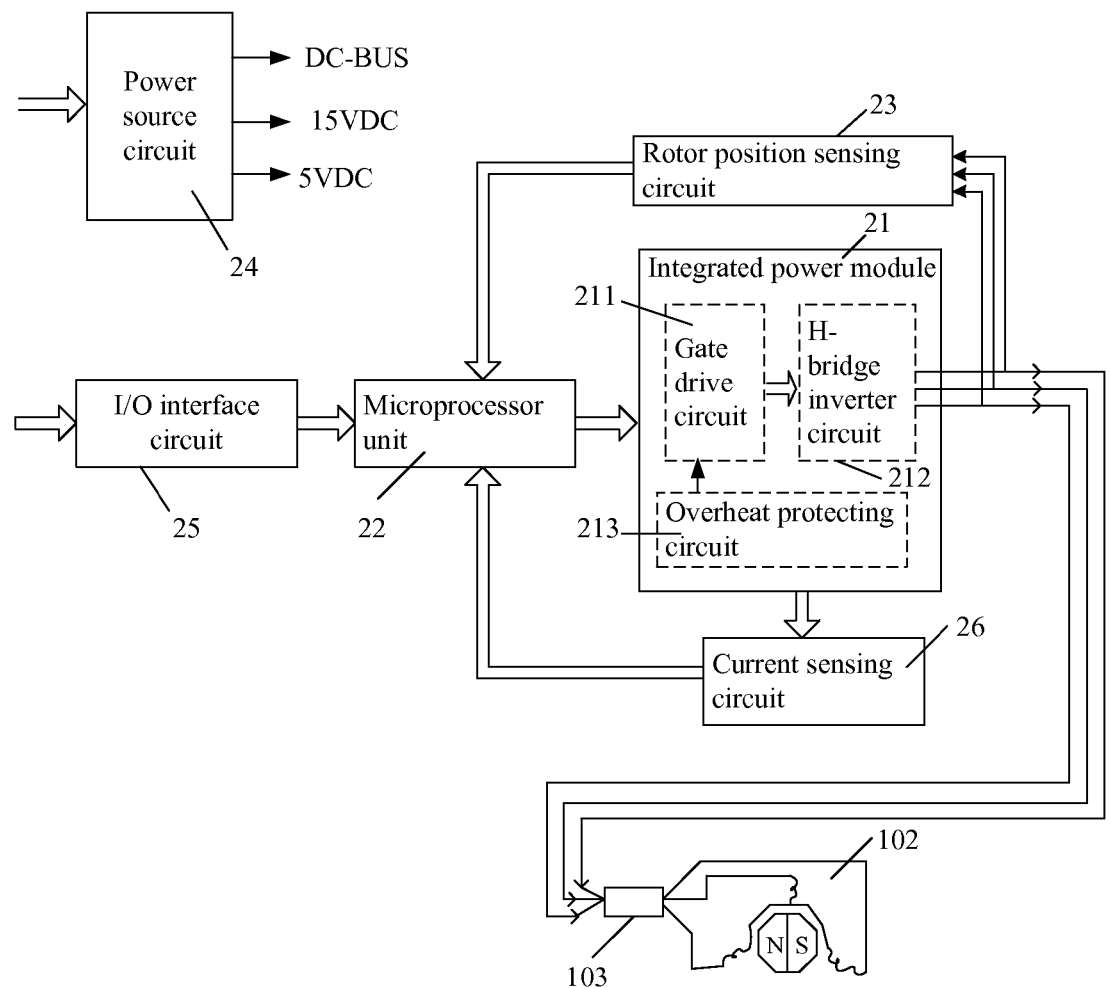
FIG. 1 is a circuit block diagram of a brushless DC motor according to one embodiment of the invention.
Figure 2:
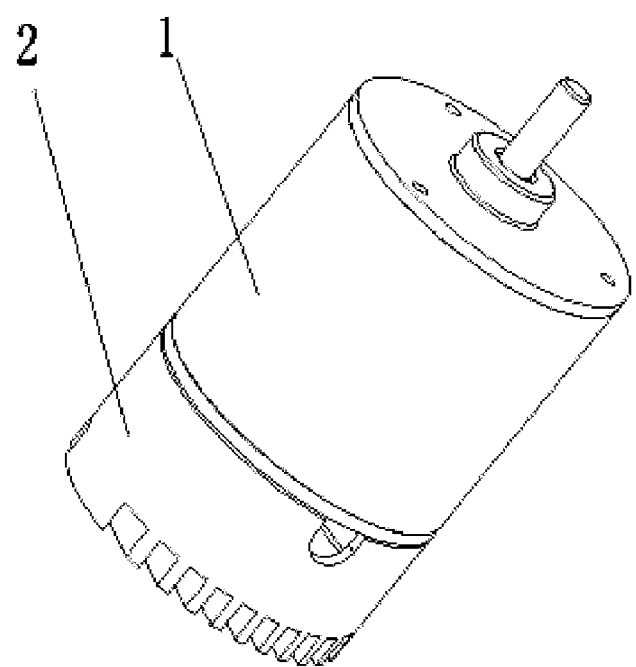
FIG. 2 is an external perspective view thereof.
Figure 3:
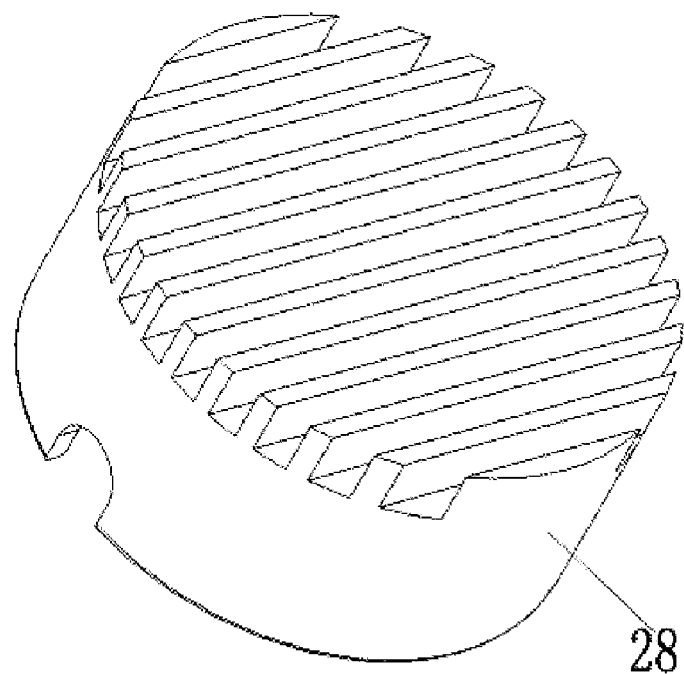
FIG. 3 is an external perspective view of a controller box according to one embodiment of the invention.
Figure 4:
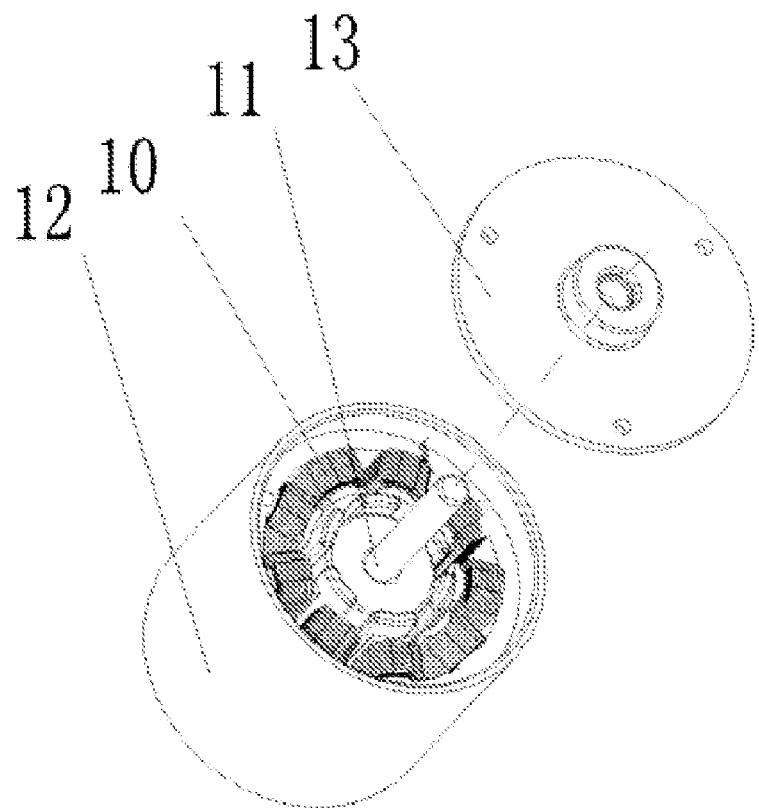
FIG. 4 is an exploded view of a brushless DC motor according to one embodiment of the invention.

As shown in FIGS. 1-5, the brushless DC motor comprises a brushless DC motor unit 1 and a controller unit 2. The brushless DC motor unit 1 comprises a stator assembly 10, a permanent magnet rotor assembly 11 magnetically coupled with the stator assembly 10, an enclosure 12 supporting the installation of the stator assembly 10 and the permanent magnet rotor assembly 11, and an end shield 13 installed at the end of the enclosure 12. The rotating shaft of the permanent magnet rotor assembly 11 projects out of the end shield 13.

The controller unit 2 comprises an integrated power module 21, a microprocessor unit 22, a rotor position sensing circuit 23, a power source circuit 24, an I/O interface circuit 25, a current-sensing circuit 26, and a controller box 28. The output terminal of the microprocessor unit 22 is connected to the input terminal of the integrated power module 21. The output terminal of the integrated power module 21 is connected to the winding 102 of the stator assembly 10. The input terminal of the rotor position sensing circuit 23 is connected to the output terminal of the integrated power module 21 or is connected to the detector serving to detect the position of the permanent magnet rotor assembly 11. The output terminal of the rotor position sensing circuit 23 is connected to the input terminal of the microprocessor unit 22. The input terminal of the current-sensing circuit 26 is connected to the output terminal of the integrated power module 21. The output terminal of the current-sensing circuit 26 is connected to the input terminal of the microprocessor unit 22. The input terminal of the power source circuit 24 is connected to an external power source. The output terminal of the power source circuit 24 serves to power the various circuits. The I/O interface circuit 25 serves to bidirectionally electrically connect the microprocessor unit 22 and the unit to be powered so as to realize data exchange. The above described circuits are fabricated into printed circuit board, which is installed inside of the controller box 28.

The controller unit is assembled below and is electrically connected to the brushless DC motor unit 1.

Figure 5:
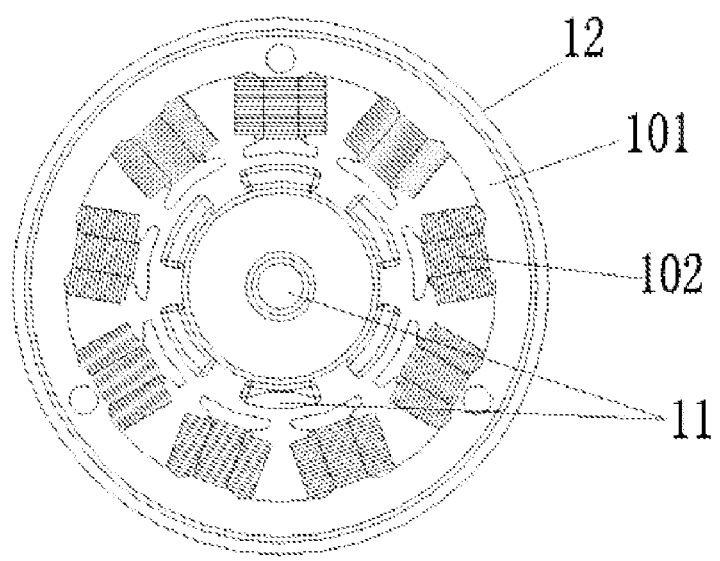
FIG. 5 is a top cross-sectional view thereof.

As shown in FIG. 5, the stator assembly of the brushless DC motor comprises a stator core 101, a plurality of windings 102 coiled on the stator core 101, and a winding connecting wire 103. One end of the winding connecting wire 103 is connected to the winding 102 and the other end is connected to the controller 2.

The I/O interface circuit 25 comprises a plurality of low voltage signal processing circuits. The low voltage signal processing circuits are bidirectionally electrically connected to the microprocessor unit 22.

Various control units serving to control the operation characteristics of the motor are stored in the microprocessor unit 22, including, without limitation, a torque regulation control unit, a rotating speed regulation control unit, and an air volume regulation control unit. By selecting different control units of the microprocessor unit 22 and inputting motor operation parameters through the I/O interface circuit 25, the brushless DC motor unit 1 is operated under the desired conditions and parameters.

The integrated power module 21 comprises at least the functional circuits of the H-bridge inverter circuit 212, the gate drive circuit 211, and overheat protecting circuit 213. The output terminal of the H-bridge inverter circuit 212 is connected to the connecting wire 103 of the winding 102. The output terminal of the gate drive circuit 211 is connected to the input terminal of H-bridge inverter circuit 212. The output terminal of the overheat protecting circuit 213 is connected to the input terminal of the gate drive circuit 211.

The voltage value at the output end of the power source circuit 24 comprises at least the values of 5 V DC, 15 V DC, and a DC bus voltage value provided by a power supply used to power the system.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

What is claimed is:

1. A brushless DC motor, comprising
  a brushless DC motor unit (1) comprising a stator assembly (10) having a winding (102); a permanent magnet rotor assembly (11) magnetically coupled with said stator assembly (10); an enclosure (12) supporting the installation of said stator assembly (10) and said permanent magnet rotor assembly (11); an end shield (13) installed at one end of the enclosure (12); and a rotating shaft of the permanent magnet rotor assembly (11) projecting out of said end shield (13); and
  a controller unit (2) comprising an integrated power module (21) having an input terminal and an output terminal; a microprocessor unit (22) having an input terminal and an output terminal; a rotor position sensing circuit (23) having an input terminal and an output terminal; a power source circuit (24) having an input terminal and an output terminal; an I/O interface circuit (25) for inputting motor operation parameters; a current-sensing circuit (26) having an input terminal and an output terminal; a plurality of control units serving to control operation characteristics of the motor; and a controller box (28);
wherein:
  said output terminal of said microprocessor unit (22) is connected to said input terminal of said integrated power module (21);
  said output terminal of said integrated power module (21) is connected to said winding (102) of said stator assembly (10);
  said input terminal of said rotor position sensing circuit (23) is connected to the output terminal of the integrated power module (21) or is connected to a detector serving to detect the position of the permanent magnet rotor assembly (11);
  said output terminal of said rotor position sensing circuit (23) is connected to said input terminal of said microprocessor unit (22);
  said input terminal of said current-sensing circuit (26) is connected to said output terminal of said integrated power module (21);

said output terminal of said current-sensing circuit (26) is connected to said input terminal of said microprocessor unit (22);

neither said input terminal nor said output terminal of said current-sensing circuit (26) is directly connected to the output of said power source circuit (24);

said input terminal of said power source circuit (24) is connected to an external power source;

said output terminal of said power source circuit (24) serves to power said rotor position sensing circuit (23), said microprocessor unit (22), said integrated power module (21), said I/O interface circuit (25), and said current-sensing circuit (26);

said I/O interface circuit (25) serves to bidirectionally electrically connect said microprocessor unit (22) and a unit to be powered by the brushless DC motor so as to realize data exchange;

said power source circuit (24), and said rotor position sensing circuit (23), said microprocessor unit (22), said integrated power module (21), said I/O interface circuit (25), and said current-sensing circuit (26) are fabricated into a printed circuit board disposed inside said controller box (28); and said controller unit (2) is electrically connected to said brushless DC motor unit (1).

2. The motor of claim 1, wherein said stator assembly (10) comprises a stator core (101), a plurality of windings (102) coiled on said stator core (101), and a winding connecting wire (103) having a first end and a second end;

said first end of said winding connecting wire (103) is connected to said winding (102); and said second end of said winding connecting wire (103) is connected to said controller (2).

3. The motor of claim 2, wherein said I/O interface circuit (25) comprises a plurality of low voltage signal processing circuits; and said low voltage signal processing circuit is bidirectionally electrically connected to said microprocessor unit (22).

4. The motor of claim 2, wherein said integrated power module (21) comprises at least functional circuits of an H-bridge inverter circuit (212), a gate drive circuit (211), and an overheat protecting circuit (213);

an output terminal of said H-bridge inverter circuit (212) is connected to said connecting wire (103) of said winding (102);

an output terminal of said gate drive circuit (211) is connected to an input terminal of said H-bridge inverter circuit (212); and an output terminal of said overheat protecting circuit (213) is connected to an input terminal of said gate drive circuit (211).

5. The motor of claim 1, wherein said I/O interface circuit (25) comprises a plurality of low voltage signal processing circuits; and said low voltage signal processing circuit is bidirectionally electrically connected to said microprocessor unit (22).

6. The motor of claim 1, wherein said plurality of control units serving to control operation characteristics of the motor are disposed in said microprocessor unit (22).

7. The motor of claim 6, wherein said control unit serving to control operation characteristics of the motor comprises a torque regulation control unit, a rotating speed regulation control unit, and an air volume regulation control unit.

8. The motor of claim 6, wherein said integrated power module (21) comprises at least functional circuits of an H-bridge inverter circuit (212), a gate drive circuit (211), and an overheat protecting circuit (213);

an output terminal of said H-bridge inverter circuit (212) is connected to said connecting wire (103) of said winding (102);

an output terminal of said gate drive circuit (211) is connected to an input terminal of said H-bridge inverter circuit (212); and an output terminal of said overheat protecting circuit (213) is connected to an input terminal of said gate drive circuit (211).

9. The motor of claim 6, wherein said output voltage value of said power source circuit (24) comprises at least a 5V DC voltage, a 15V DC voltage, and a DC bus voltage provided by an external power supply.

10. A method for operating the motor of claim 6 according to desired characteristics and parameters comprising selecting different control unit of the microprocessor unit and inputting motor operation parameters into said control units via said I/O interface circuit (25).

11. The motor of claim 1, wherein said integrated power module (21) comprises at least functional circuits of an H-bridge inverter circuit (212), a gate drive circuit (211), and an overheat protecting circuit (213);

an output terminal of said H-bridge inverter circuit (212) is connected to said connecting wire (103) of said winding (102);

an output terminal of said gate drive circuit (211) is connected to an input terminal of said H-bridge inverter circuit (212); and an output terminal of said overheat protecting circuit (213) is connected to an input terminal of said gate drive circuit (211).

* * * * *